United States Patent [19]

Heine

[11] Patent Number: 4,493,222
[45] Date of Patent: Jan. 15, 1985

[54] GEARLESS SPEED AND TORQUE CONVERTER

[75] Inventor: Otto R. Heine, Poway, Calif.

[73] Assignee: R&H Technology, Inc., Minneapolis, Minn.

[21] Appl. No.: 370,593

[22] Filed: Apr. 21, 1982

[51] Int. Cl.$^3$ .................. F16H 3/00; F16H 11/00; F16H 15/00; F16H 13/02

[52] U.S. Cl. .................. 74/216.3; 74/202; 74/798; 74/206

[58] Field of Search .......... 74/202, 206, 211, 212, 74/198, 214, 798, 216.3, 208, 209

[56] References Cited

U.S. PATENT DOCUMENTS

| | | | |
|---|---|---|---|
| 2,711,655 | 6/1955 | Schottler | 74/459 |
| 2,749,761 | 6/1956 | Mackta | 74/216.3 |
| 2,764,030 | 9/1925 | Mackta | 74/216.3 |
| 2,874,594 | 2/1959 | Sundt | 74/805 |
| 3,046,808 | 7/1962 | De Mart | 74/424.8 |
| 3,049,019 | 8/1962 | La Pointe et al. | 74/202 |
| 3,302,477 | 2/1967 | Grabowski | 74/424.8 |
| 3,895,540 | 7/1975 | Davidson | 74/800 |
| 4,221,137 | 9/1980 | Futaba | 74/216.3 |
| 4,366,723 | 1/1983 | Wilke et al. | 74/216.3 |

OTHER PUBLICATIONS

Brochure entitled "Anti-Friction Drive"; Advanced Energy Technology Inc., Copyright 1981.
"A First in Gears: No Teeth" p. 90, Business Week: Nov. 30, 1981.

Primary Examiner—Lawrence J. Staab
Assistant Examiner—Michael David Bednarek
Attorney, Agent, or Firm—Klein, Szekeres & Fischer

[57] ABSTRACT

A gearless speed and torque converter is disclosed wherein a first member or input member fixedly mounted to a rotatable input shaft has an Archimedes spiral groove-bearing surface. A second member or output member fixedly mounted to a rotatable output shaft has an Archimedes spiral groove-bearing surface which is complementary to the spiral groove-bearing surface of the input member and is disposed adjacent thereto. The Archimedes spiral groove of the output member has a pitch different from the pitch of the Archimedes spiral groove of the input member. The input shaft and the output shaft are coaxially mounted relative to one another. A plurality of balls are disposed between the respective spiral grooves and are held therein solely by virtue of being captured in the intersecting spaces of the spiral grooves. During rotation of the input member, the balls move on a spiral track at a rotational speed which is an average of the rotational speeds of the input and output members. The speed of rotation of the input and output members is inversely proportional to the pitch ratio of the Archimedes spiral grooves of the respective members. A ball circulation channel provided in one of the input or output members permits the balls to enter the spiral grooves substantially at the beginning of the spiral grooves for travel therein and to exit from the spiral grooves substantially at their end. One or more intermediate spiral groove-bearing members interfacing with the input and output members and with one another, if applicable, may be provided to coact through additional balls with the input and output members, and with one another, if applicable, to provide speed and torque conversion in several stages or steps.

28 Claims, 15 Drawing Figures

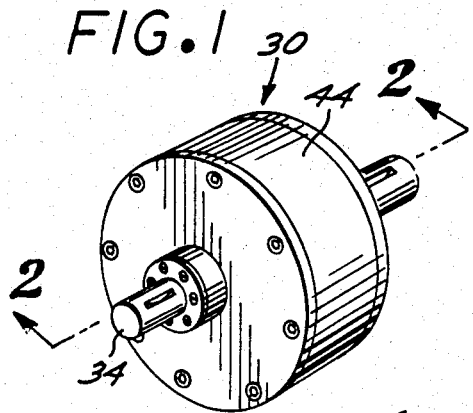
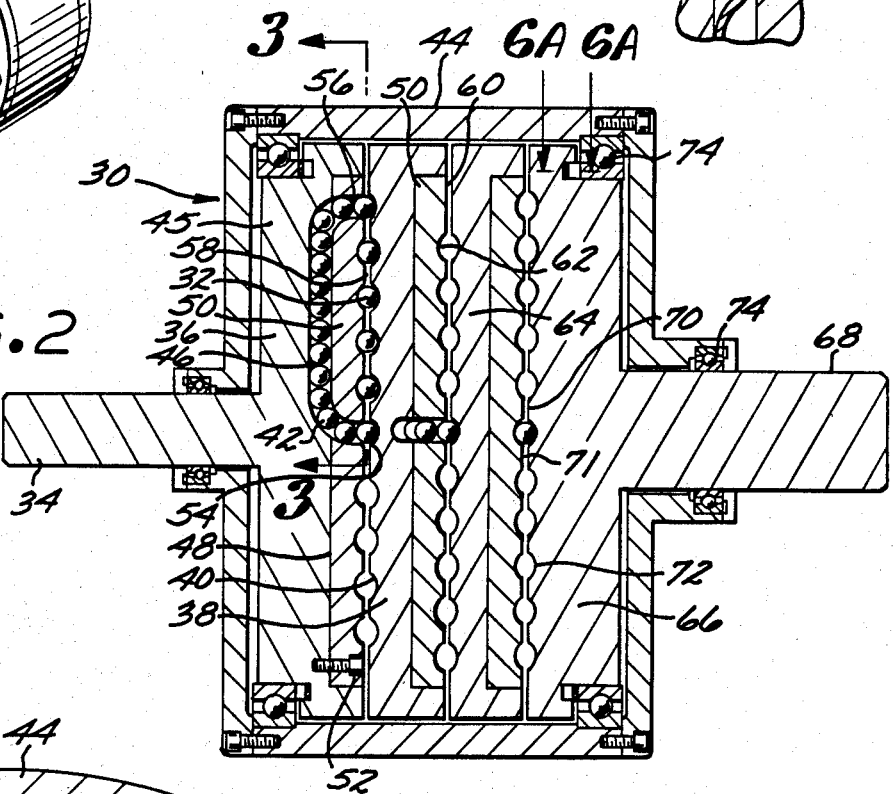
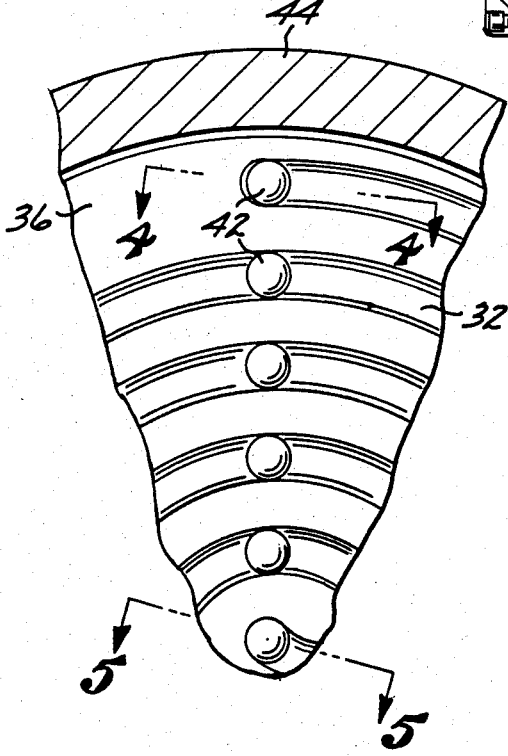
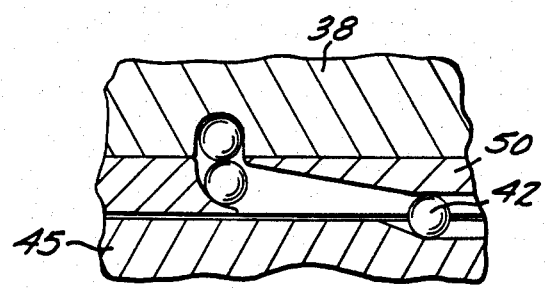
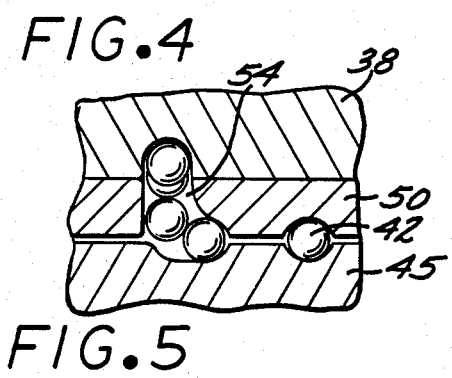

GEARLESS SPEED AND TORQUE CONVERTER

BACKGROUND OF THE INVENTION

1. Field of the Invention

The present invention is directed to a gearless speed and torque converter. More specifically, the present invention is directed to an in-line speed and torque converter wherein balls undergo motions in Archimedes spiral grooves to convert speed and torque in several stages.

2. Brief Description of the Prior Art

Speed reducers, torque converters, gear boxes and the like have been known for a long time. A serious disadvantage of most prior art torque converters or gear boxes is that a relatively large amount of energy is lost to friction during torque conversion. The energy loss is particularly serious in gear boxes or gear trains employing a worm gear-pinion gear combination, where at relatively low speeds often more than half of the inputted rotational energy is lost to friction.

Another disadvantage of conventional gear boxes is that they are usually relatively bulky, and often hard to adapt to function as in-line torque and speed converters.

In order to overcome the well known disadvantages of conventional "gear boxes," the prior art has also provided speed and torque converters which utilize an eccentric or "nutation" type drive in combination with conventional gears. Such a device is shown, e.g., in U.S. Pat. No. 3,895,540. Eccentric drives have also been combined in the prior art with balls moving in scalloped tracks to provide torque conversion without the use of conventional toothed gears. Such a device is disclosed in a brochure titled "Anti-Friction Drive" by Advanced Energy Technology, Inc. of Boulder, Colo.

U.S. Pat. Nos. 2,749,761 and 2,764,030 are of particular interest to the present invention because these two patents disclose gearless speed and torque converters, which utilize a plurality of balls moving in spiral grooves machined into adjoining surfaces to provide speed and torque conversion.

More specifically, U.S. Pat. No. 2,749,761 purports to disclose a speed reducer which has two members mounted adjacent to one another on parallel but not colinearly disposed axes. The driving member has spiral grooves incorporated into its outer surface and the driven member has spaced radial ribs incorporated into its outer surface. A closed loop ball conduit having a plurality of balls is located adjacent to the driving and driven members and has an opening at a location where the spiral grooves and the radial ribs interface with one another. The balls continuously circulating in the loop are said in the patent to transmit power with a minimum amount of rubbing friction.

U.S. Pat. No. 2,764,030 purports to disclose a coaxial speed-reducing device wherein the driving member and the driven member both have spiral grooves machined into their adjoining surfaces. A plurality of balls are held between the adjoining spiral groove-bearing surfaces by the grooves and by a fixedly mounted ball race or ball retainer which has radial slots to allow movement of the balls only in a radial, outward direction. Speed reduction of the device is determined by the pitch ratios of the spiral grooves of the driving and driven members. The speed-reducing device is said in the patent to be durable, to require only a minimum amount of lubrication and to be suitable for use in a wide range of speed-reduction ratios.

The speed-reducing devices disclosed in the above-noted U.S. Pat. Nos. 2,749,761 and 2,764,030, however, suffer from extremely serious disadvantages regarding the amount of lubrication needed to keep the device even marginally operational, regarding the speed reduction achievable by the devices, and, most importantly, regarding the energy efficiency and the ability of the devices to transmit torques of significant magnitude. This is because the ball race or ball retainer (designated, e.g., 19 in FIG. 5 of U.S. Pat. No. 2,764,030) prevents the balls from undergoing an orbiting or circulating motion about the common axis of rotation of the driving and driven members, and allows only for their radially outward-bound motion. In the device disclosed in U.S. Pat. No. 2,749,761 the ball conduit (designated 22, e.g., in FIG. 1 of the patent) plays a similar role restricting movement of the balls.

As it becomes more apparent from the ensuing description of the present invention, in a device wherein torque is transmitted by a plurality of balls from one rotating member to another, the balls must be allowed to move freely in a circulating or orbiting motion (simultaneously with a radial motion) in order to operate with low friction. In the absence of this freedom of motion, as in the devices disclosed in U.S. Pat. Nos. 2,749,761 and 2,764,030, the balls necessarily slide between the two rotating surfaces. As is well understood by those skilled in the mechanical arts, significant sliding motion is simply incompatible with operation even at moderate efficiency and for transmission for anything other than minimal amounts of torque. Furthermore, a device wherein undesirable sliding motion occurs during power transmission necessarily has an unacceptably short operating life.

In light of the foregoing and other reasons, a significant need still exists in the prior art for efficient torque conversion devices, and especially for efficient in-line speed-reducing torque conversion devices. The present invention satisfies this need.

To provide further background to the present invention, and generally to the state-of-the-art relating to ball screws and the like, reference is made to U.S. Pat. Nos. 2,874,594; 2,711,655; 3,046,808; 3,302,477; and 4,221,137.

SUMMARY OF THE INVENTION

It is an object of the present invention to provide a torque conversion device which operates at a very high efficiency.

It is another object of the present invention to provide a torque conversion, particularly a speed-reducing and torque-increasing device which is highly suitable for in-line applications.

It is still another object of the present invention to provide a speed-reducing torque conversion device which is compact, adapted for in-line applications, and nevertheless is capable of operating in a very wide range of speed-reducing ratios.

These and other objects and advantages are attained by a torque conversion device which has a rotatable input shaft and a first member or input member fixedly mounted on the input shaft to rotate therewith. A second member or output member is fixedly mounted to rotate together with an output shaft which is coaxially disposed with the input shaft. The input member and the output member each have a surface which incorporates an Archimedes spiral groove of a predetermined pitch. The respective pitches of the Archimedes spiral grooves of the input and output members are different, and the ratio of the pitches determines the speed and torque conversion attainable by the device.

The respective spiral groove-bearing surfaces of the input and output members interface one another. A plurality of balls are disposed between the spiral groove-bearing surfaces and are held therein solely by virtue of being placed in the intersecting spaces of the spiral grooves.

Rotation of the input shaft causes the balls to simultaneously rotate about the common axis of the input and output shafts and to move radially outwardly relative to the common axis while torque is transmitted to the output member. The balls exit, one-by-one, from the interfacing grooves at a location relatively remote from the common axis. A suitable ball circulation channel located in the input member or in the output member provides for continuous reentry of the balls into the interfacing spiral grooves at a location proximate to the common axis, so that the balls are continuously available for torque transmission.

One or several intermediate members having spiral grooves on at least two surfaces and having appropriately positioned ball circulation channels, and additional balls may be mounted between the input and output members to provide torque conversion in two or more stages.

The features of the present invention can be best understood, together with further objects and advantages, by reference to the following description, taken in connection with the accompanying drawings wherein like numerals indicate like parts.

BRIEF DESCRIPTION OF THE DRAWINGS

FIG. 1 is a perspective view of the first preferred embodiment of a torque converter constructed in accordance with the present invention.

FIG. 2 is a cross-sectional view of the first preferred embodiment of the torque converter, the cross-section being taken on lines 2,2 of FIG. 1;

FIG. 3 is a partial cross-sectional view of the first preferred embodiment of the torque converter, the cross-section being taken on lines 3,3 of FIG. 2;

FIG. 4 is another partial cross-sectional view of the first preferred embodiment of the torque converter, the cross-section being taken on lines 4,4 of FIG. 3;

FIG. 5 is still another partial cross-sectional view of the first preferred embodiment of the torque converter, the cross-section being taken on lines 5,5 of FIG. 3;

FIG. 6A is a cross-sectional view taken on lines 6,6 of FIG. 2;

DESCRIPTION OF THE PREFERRED EMBODIMENTS

Figure 6:
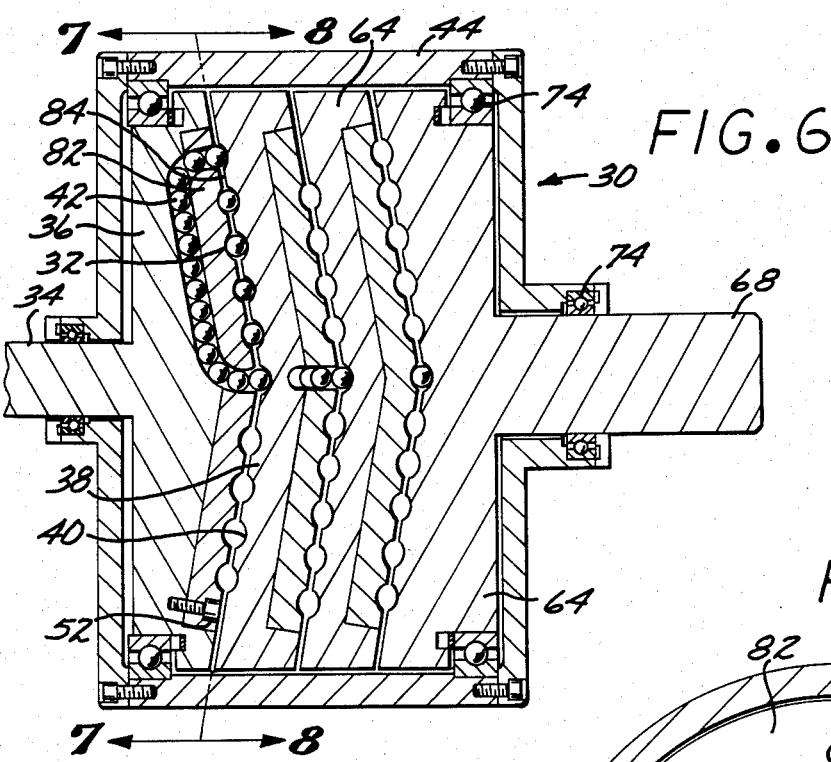
FIG. 6 is a cross-sectional view of a second preferred embodiment of the torque converter of the present invention, the cross-section being analogous to the cross-section n lines 2,2 of FIG. 1.

The following specification taken in conjunction with the drawings sets forth the preferred embodiments of the present invention in such a manner that any person skilled in the mechanical arts can use the invention. The embodiments of the invention disclosed herein are the best modes contemplated by the inventor for carrying out his invention in a commercial environment, although it should be understood that various modifications can be accomplished within the parameters of the present invention.

Referring now to the drawing figures, and particularly to the cross-sectional view of FIG. 2, a first preferred embodiment of the torque converter 30 of the present invention is disclosed. It should be noted at the outset, that the torque converter of the present invention is highly suitable to function as an in-line torque converter in the sense that the torque converter 30 is readily coupled coaxially with a rotating output shaft (not shown), of a prime mover (not shown) or the like. Furthermore, in this arrangement the rotating power output of the torque converter 30 is also coaxial with the rotating output shaft (not shown) of the prime mover (not shown). As is well known in the art, in most, but not all, situations the function of a torque converter is to reduce the rotational speed of the rotating output shaft (not shown) of a prime mover (not shown) and to increase its torque. Therefore, the herein-described preferred embodiments of the torque converter 30 of the present invention are adapted to function as speed reducers. For this reason, in the ensuing description the torque converter of the present invention is also referred to as a speed reducer 30. However, it should be kept in mind that the torque converter 30 of the present invention may also be constructed to function as a speed increaser and torque reducer.

Referring again to the drawing figures, and principally to FIG. 2, the basic principle of operation of the torque converter 30 of the present invention is described. An Archimedes spiral groove 32 is provided in the surface of a plate or member which is fixedly connected to an input shaft 34. On the drawing figures the plate or member bearing the first Archimedes spiral groove 32 bears the reference numeral 36. Hereinafter it is referred to as the input plate or input member 36.

A second plate or member 38, bearing a second Archimedes spiral groove 40, interfaces with the input member 36 so that the first and second spiral grooves 32 and 40 are proximate to each other. In the herein shown preferred embodiments of the torque converter 30, the second member 40 is an intermediate member because the herein specifically shown preferred embodiments operate in several stages or steps of torque conversion. In alternative embodiments of the torque converter 30 of the present invention, which operate in a single stage only, the second member 40 is a final, output member.

A plurality of balls 42 are held between the first or input member 36 and the second member 38, so that the balls simultaneously engage both the first and second spiral grooves 32 and 40. More accurately speaking, the first or input member 36 and the second member 38 are incorporated in a suitable housing 44, and are disposed therein so that the balls 42 are held in intersecting spaces of the first and second spiral grooves 32 and 40 solely on account of the above-described spatial arrangement. No additional ball races or ball retainers are provided; nor can they be provided for the proper functioning of the torque converter 30.

Respective pitches of the first and second Archimedes spirals 32 and 40 are different from one another. Consequently, when the first member or input member 36 is rotated by an outside force (such as the prime mover connected to the input shaft 34), the balls 42 cause the second member 38 to rotate also, but at a different speed than the first or input member 36. The relative rotational speeds of the first input member 36 and of the second member 38 as a function of the relative pitch ratios of the respective spiral grooves 32 and 40, are readily understood when the following is considered.

An Archimedes spiral is a curvilinear line, which on a flat plate is described by the polar equation $$R = \frac{R_0 \phi}{2\pi} \qquad \text{Equation I}$$

wherein $R_0$ is the pitch of the spiral, R is the distance of any point of the spiral from the point of origin of the spiral, and $\phi$ is the angle of the radius or line leading from the point of origin to the point in question on the spiral. It can also be said that an Archimedes spiral on a flat plate is a spiral which is drawn by a point travelling at a constant velocity radially outwardly from a center point, and simultaneously also rotating at a constant angular velocity about the centerpoint.

In accordance with the present invention the first and second Archimedes spiral grooves 32 and 40 have different pitches. Therefore, the Archimedes spiral grooves 32 and 40 are respectively represented by Equations II and III, wherein $R_{01}$ is the pitch of the first Archimedes spiral 32, and $R_{02}$ is the pitch of the second Archimedes spiral 40. $R_1$, $R_2$, $\phi_1$ and $\phi_2$ are the corresponding polar coordinates of the spirals.

$$R_1 = \frac{R_{01} \phi_1}{2\pi} \qquad \text{Equation II}$$

$$R_2 = \frac{R_{02} \phi_2}{2\pi} \qquad \text{Equation III}$$

Since the balls 42 are held between the intersecting or superimposed spaces of the two spiral grooves 32 and 40, and the spiral grooves 32 and 40 have a common centerpoint, therefore, at any intersecting space or ball location the respective radii of the spiral grooves must be equal (Equation IV).

$$R_1 = R_2 \qquad \text{Equation IV}$$

Furthermore, if the speed of rotation of the first or input member 36 is designated $n_1$, and the speed of rotation of the second member is $n_2$, and t is time, then $$\phi_1 = n_1 t \qquad \text{Equation V}$$

ti $$\phi_2 = n_2 t \qquad \text{Equation VI}$$

From Equations II through VI it follows that $$R_{01} n_1 = R_{02} n_2 \qquad \text{Equation VII}$$

and $$\frac{R_{01}}{R_{02}} = \frac{n_2}{n_1} \qquad \text{Equation VIII}$$

Thus, the speeds of rotation of the first or input member 36 and second member 38 are in inverse ratio to the pitches of the respective Archimedes spirals.

Each ball 42 spaced between the spiral grooves 32 and 40 also undergoes an Archimedes spiral-type motion, while torque is transmitted from the first or input member 36 to the second member 38. In other words, each ball 42 rotates about the centerpoint of the spirals and also simultaneously moves radially outwardly. Since, in accordance with the present invention no ball race or ball retainer is provided in addition to the spiral groove-bearing members, the above-noted "spiral" motion of the balls 42 is unimpeded. This is a critical feature of the present invention which renders the torque converter 30 of the present invention operable at a truly high efficiency.

In order to understand and underscore the importance of the free "spiral" motion of the balls 42 in the torque converter 30 of the present invention, particularly in contrast with the subject matter of U.S. Pat. Nos. 2,749,761 and 2,764,030, the following is noted.

In order to avoid undue friction of the balls 42, the balls 42 must be rolling, rather than sliding, in the respective spiral grooves 32 and 40. In the torque converter 30 of the present invention, the balls 42 rotate about the centerpoint of the spiral grooves (while they also move radially outwardly) at a rotational speed which avoids sliding. For this to occur, the difference in speed of the balls 42 relative to the slower member (on a speed reducer the second member 38) must equal the difference in the rotational speed of balls 42 relative to the faster member (in a speed reducer the first or input member 36). This relationship is set forth in Equation IX wherein $n_B$ is the rotational speed of the balls.

$$n_1 - n_B = n_B - n_2 \qquad \text{Equation IX}$$

From Equation IX it follows that the rotational speed of the balls 42 is the "average" of the rotational speeds of the two rotating members 36 and 38 (Equation X).

$$n_B = \frac{n_1 + n_2}{2} \qquad \text{Equation X}$$

For example, in a torque converter speed reducer 30 built in accordance with the present invention wherein there is a five-fold speed reduction between the first or input member 36, and the second member 38, and wherein the input member rotates at 1750 RPM, the second member 38 rotates at 350 RPM. It follows from Equation X that the balls 42 rotate at 1050 RPM. If, in the example, the diameter of the balls 42 disposed between the first member 36 and the second member 38 is 0.1875 inch, then at a point between the members 36 and 38 at a 1.5 inch distance from the centerpoint of rotation, the balls 42 will be spinning at 11,200 RPM, without significantly skidding or sliding.

If the balls 42 were restrained by a ball race or ball retainer (not shown), as is done in the prior art, the rolling and spinning motion of the balls 42 would not be possible. The resulting skidding of the balls 42 in the spiral grooves 32 and 40 would create very significant friction and heat, causing very serious lubrication problems and rendering transmission of significant torque values virtually impossible.

Having thus explained the basic principle of operation of the torque converter 30 of the present invention, reference is made again to FIGS. 1 through 6, where the structure of the first preferred embodiment of the torque converter-speed reducer of the present invention is disclosed in detail.

The first preferred embodiment operates in three stages. The first member or input member 36 is fixedly mounted on the input shaft 34. The input member 36 comprises two parts. A first part 45 has an open groove or channel 46 machined into its surface 48 substantially opposite to the input shaft 34. The open groove or channel 46 is designed to become a ball circulation channel when a flat plate second part 50 of the input member 36 is mounted to the first part 45 by a plurality of bolts 52. Only one of the bolts 52 is shown on FIG. 2.

The flat plate second part 50 of the input member 36 has the first Archimedes spiral groove 32 machined into its surface, and a centrally-located aperture 54 in communication with the ball circulation channel 46 to permit balls 42 to enter, one-by-one, into the first spiral groove 32. A substantially circular groove 56 is located at a position remote from the centerpoint, substantially at the periphery of the flat plate 50 to communicate with the ball circulation channel 46 and to permit the balls 42 to enter the channel 46 one-by-one.

The second member 38, which in the first preferred embodiment of the torque converter speed reducer 30 of the present invention is an intermediate member, is similar in construction to the first or input member 36. However, the second member 38 is not attached directly to a rotating shaft. The second member 38 has two Archimedes spiral groove bearing surfaces 58 and 60.

A first spiral groove bearing surface 58 of the second member 38 interfaces with the flat plate 50 of the first input member 36. In accordance with the principles described above, the pitch of the second spiral groove 40 incorporated in the first surface 58 is greater than the pitch of the first spiral groove 32. For example, in order to provide a 4:1 speed reduction ratio, the pitch of the Archimedes spiral groove 40 machined into the first surface 58 of the second member 38 is four (4) times greater than the pitch of the first spiral groove 32.

It was found preferable, in accordance with the present invention, to provide several spiral grooves 40 of the larger pitch in the first spiral groove bearing surface 48. Each of the spiral grooves 40, of course, has the same pitch, and the several spiral grooves 40 are symmetrically placed relative to one another to provide several paths for the balls 42. This is best shown on the schematic views of FIGS. 9 and 10.

Generally speaking, it is preferred in accordance with the present invention, to provide at least four evenly spaced spiral grooves of the larger pitch in the slower rotating member of any interfacing two spiral groove-bearing members. On the other hand, the faster rotating member, having the spiral groove of smaller pitch, has only one spiral groove. It was found in accordance with the present invention, that when the ratios of the pitches of the spiral grooves is an integer, then the balls 42 are lined up in straight lines between the interfacing spiral groove-bearing members. Furthermore, it was found that when m number of spiral grooves of the larger pitch are provided in the slower rotating member, then the number of evenly spaced straight lines formed by the balls is $m-1$. Since it is highly desirable for smooth power transmission to have at least three lines or rows of balls 42 between the interfacing members, preferably at least four (4) spiral grooves of the larger pitch are provided in the slower rotating member. The three rows of balls (or more) between the interfacing members substantially lessens, and in some cases even eliminates, the need for additional bearings.

Figure 9:
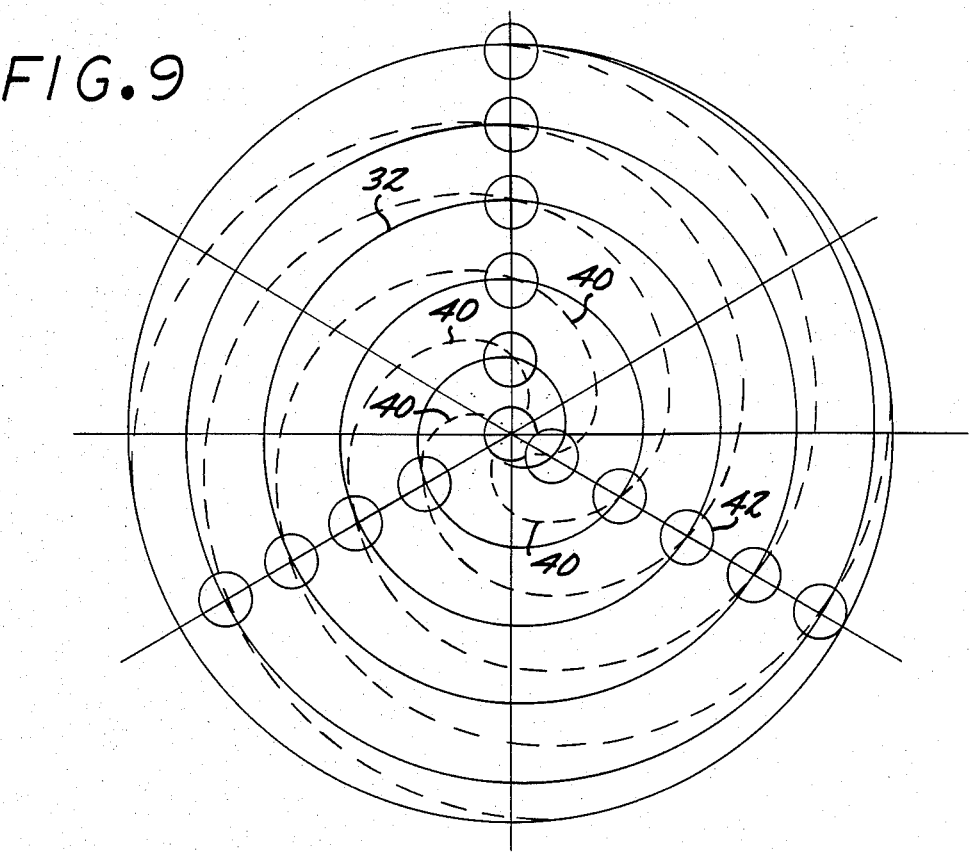
FIG. 9 is a schematic view showing disposition of a plurality of balls during torque conversion in a torque converter constructed in accordance with the present invention.

In accordance with the foregoing, FIG. 9 schematically shows that in a pair of interfacing members wherein the faster rotating member has one Archimedes spiral groove 32 of a smaller pitch (shown with solid line), and the slower rotating member has four (4) evenly-spaced Archimedes spiral grooves 40 (shown with dotted lines) of a larger pitch, the balls 42 are lined up in three (3) evenly spaced rows.

Figure 10:
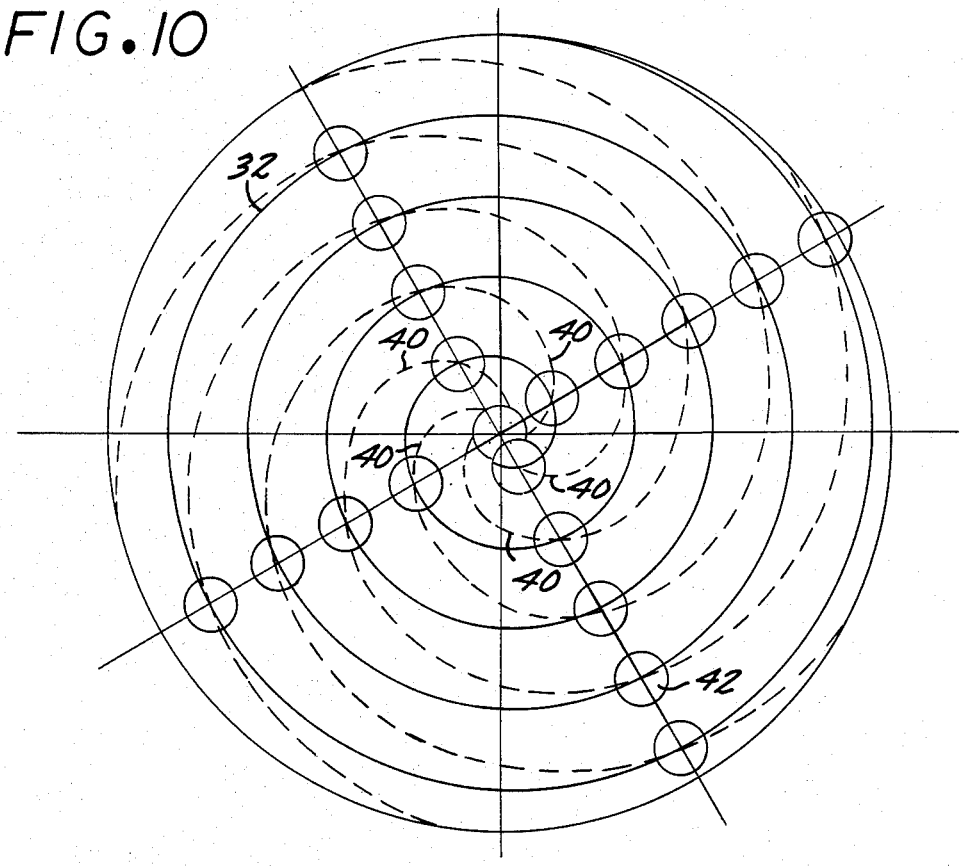
FIG. 10 is a schematic view showing disposition of a plurality of balls in another torque converter constructed in accordance with the present invention.

FIG. 10 schematically shows that in a pair of interfacing members wherein the faster rotating member has one Archimedes spiral groove 32 of a smaller pitch (shown with solid line) and the slower rotating member has five (5) evenly-spaced spiral grooves 40 (shown with dotted lines) of a larger pitch, the balls 42 are lined up in four (4) evenly spaced rows.

It will be readily appreciated by those skilled in the art, that the larger is the pitch of the spiral grooves, the more technically feasible it is to provide more and more evenly-spaced spiral grooves in the same surface. In accordance with the present invention it is most preferred that as many evenly-spaced Archimedes spiral grooves be provided in the slower rotating member as the closest integer number to the speed reduction ratio achieved by the interfacing spiral groove-bearing members. In any event, at least four (4) spiral grooves are preferably provided in the slower rotating member, as is shown in FIG. 9.

Returning now to the description of the first preferred embodiment of the torque converter 30 of the present invention, and particularly to FIG. 2, the second or intermediate member 38 is shown to include a flat plate 50 similar or identical in construction to the flat plate 50 of the first or input member 36. The flat plate 50 incorporates the second spiral groove-bearing surface 60 which cooperates with a ball circulation channel 46 in the same manner as is described above in connection with the first or input member 38. The flat plate 50 of the second or intermediate member 58 incorporates a third Archimedes spiral groove 62.

As it should already be apparent from the above description and from an inspection of FIG. 2, the third Archimedes spiral groove 62 acts as the "faster rotating" or "input" groove for the next stage of speed reduction. Although the three-stage speed reducer shown in FIG. 2 includes only one more intermediate member 64, several intermediate members 64 of identical or similar construction may be incorporated in the torque converter-speed reducer 30 of the present invention.

Furthermore, all intermediate members and 64 may be of exactly identical construction whereby rotational speed is reduced in each stage of the torque converter by the same ratio. It should be noted in this regard that the intermediate members 64 are mounted and held in their respective proper operative positions only by the sets of balls 42 disposed between the respective spiral grooves. Additional ball races or ball retainers to confine the balls 42 are definitely not employed, although conventional roller or ball bearings (not shown) may be employed to rotatably hold the intermediate members 64 relative to the housing 44.

Still referring principally to FIG. 2, a final or output member 66 is shown. The output member 66 is fixedly mounted to an output shaft 68 of the torque converter. The output member 66 includes an Archimedes spiral groove-bearing surface 70 which interfaces a like surface 71 of the last intermediate member 64. Since rotational speed is reduced and torque is increased as power is transferred from the last intermediate member 64 to the output member 66, several evenly-spaced Archimedes spiral grooves 72 of identical pitch are provided in the output member 66. In fact, the spiral groove bearing surface 70 of the output member 66 may be substantially identical with regards to the number, pitch, magnitude and spacing of the spiral grooves, to the like surfaces of the intermediate members 64.

As is shown on FIG. 2, the input member 36, the intermediate members 64 and the output member are mounted within the housing 44 in suitable thrust bearings 74. The spiral groove-bearing surfaces are held adjacent to one another to capture the balls 42 by the preloading force of a spring 76 shown on FIG. 6A.

The overall speed reduction (and torque increase) attained by a multi-stage torque converter 30 constructed in accordance with the present invention is a product of the speed reductions attained in the individual stages. It will be appreciated by those skilled in the art, that while speed reduction attainable in any single stage is somewhat limited due to the technical feasibility of providing cooperating Archimedes spiral grooves of grossly different pitches, the speed reduction attainable in several stages is practically without limit. Thus, individual stages of approximately 2:1 to 10:1 speed reduction are contemplated within the scope of the present invention with stages of 2:1 to 2:5 speed reduction being preferred. Consequently, multi-stage speed reducers or torque converters built in accordance with the present invention may provide speed reduction in approximately 5:1 to several hundred to one ratios.

Regarding the thrust bearings 74, which are designed to primarily accept axial loads, and the preloading spring 76, the following is noted.

In the torque converter 30 of the present invention, during transmission of torque, the balls 42 are in contact with the internal walls of both spiral grooves 32 and 40. On the schematic view of FIG. 13, the internal wall of the groove of the driving or input member 36 is designated 78 and the internal wall of the driven, intermediate or output member is designated 80.

Points where the ball 42 contacts the respective walls 80 and 78 are designated $P_1$ and $P_2$. The ball 42 spins about an axis which is perpendicular to a line interconnecting the points $P_1$ and $P_2$. The inclination of the spin axis relative to the horizontal direction (or more accurately stated relative to the axis of rotation of the torque converter device) varies depending upon the pitch ratios of the respective spirals.

The force vectors acting between the ball 42 and the walls 80 and 78 of the rotating members 36 and 38 are respectively designated $R_1$ and $R_2$. The force vectors $R_1$ and $R_2$ are normal to the spherical ball surface at the respective contact points $P_1$ and $P_2$. In a state of equilibrium during torque transmission, the opposite force vectors $R_1$ and $R_2$ are necessarily equal in magnitude.

Figure 13:
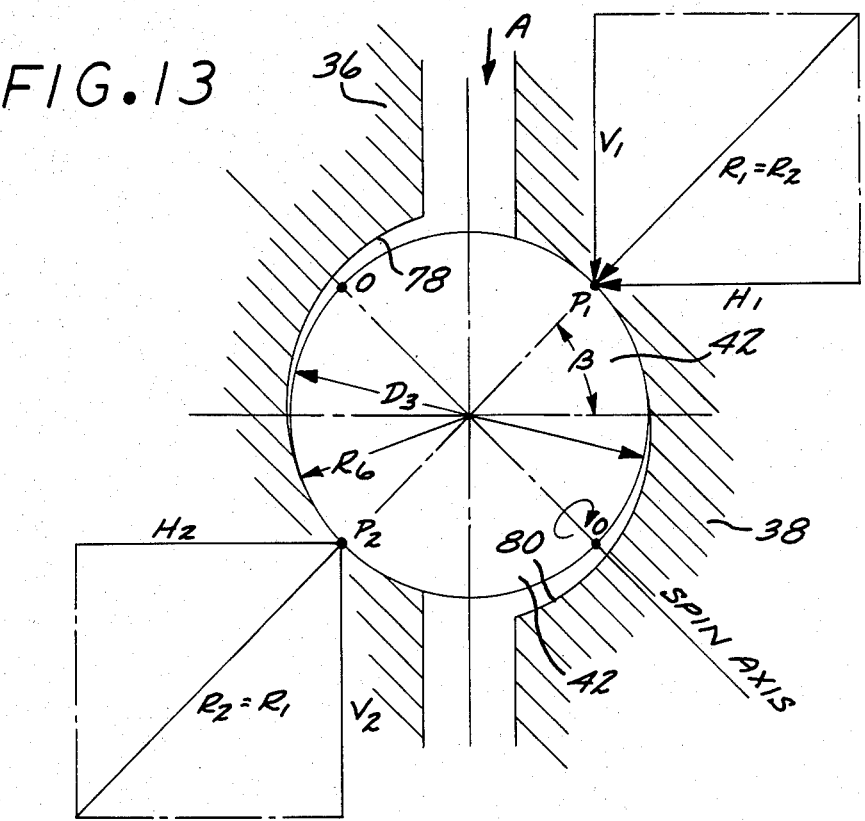
FIG. 13 is a highly schematic illustration showing forces acting on a ball disposed between intersecting Archimedes spiral grooves.

Each force vector $R_1$ and $R_2$ has a vertical and a horizontal component $V_1, H_1$ and $V_2, H_2$, respectively, as is shown on FIG. 13. In equilibrium, the vertical forces ($V_1$ and $V_2$) are equal in magnitude to one another, and the horizontal forces $H_1$ and $H_2$ are also equal in magnitude to one another. In the event the spin axis angle ($\beta$) relative to the horizontal is 45 degrees (as is shown in FIG. 13), then the vertical and horizontal components of the force vectors $R_1$ and $R_2$ are also equal in magnitude to one another.

It is readily apparent from the above description and from a consideration of the drawing figures, that in the first preferred embodiment of the torque converter 30 of the present invention (principally shown on FIG. 2) the vertical force vectors balance each other out and are not transmitted to the thrust bearings 74 or to the housing 44.

The horizontal force vectors, however, do not balance each other out, but are transmitted to the thrust bearings 74 and to the preload spring 76. For consideration of the potential magnitude of the horizontal forces, which must be absorbed by the thrust bearings 74 and the preload spring 76, reference is made to the schematic view of FIG. 14.

Figure 14:
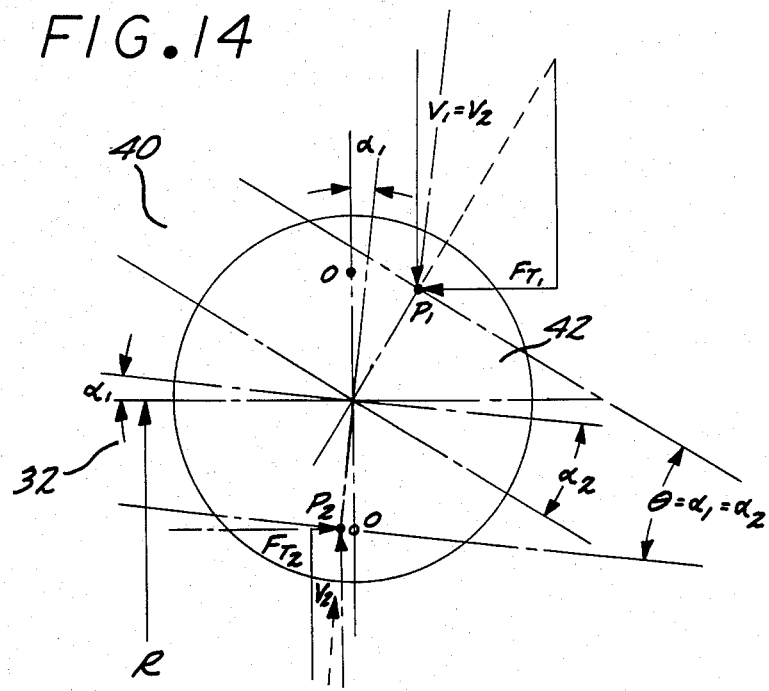
FIG. 14 is another highly schematic illustration showing forces acting on a ball disposed between intersection Archimedes spiral grooves.

In FIG. 14, the two intersecting spiral grooves are designated 32 and 40 and are shown with dotted lines. The contact points of the ball 42 are designated $P_1$ and $P_2$ as in FIG. 13. Opposite but equal vertical forces $V_1$ and $V_2$ acting at the contact points ($P_1$ and $P_2$) are shown with solid arrows. The corresponding tangential forces acting on the respective spiral grooves 32 and 40 are related to the respective tangent angles ($\alpha_1$ and $\alpha_2$) of the spiral groove walls 78 and 80 contacting the ball 42 at the respective points. These tangential forces, which are neither horizontal nor vertical, represent the force or torque transmitted by the torque converter 30. It follows from the vector diagrams shown on FIG. 14, that $$F_{T1} = \frac{V_1}{tg\alpha_1} \qquad \text{Equation XI}$$

and $$F_{T2} = \frac{V_2}{tg\alpha_2} \qquad \text{Equation XII}$$

The tangential forces $F_{T1}$ and $F_{T2}$ are, of course, not equal to one another, and have the same ratios relative to one another as the torque increase attained by the particular stage of the torque converter 30 which is comprised by the interfacing spiral groove-bearing members 36 and 38.

Since the vertical forces $V_1$ and $V_2$ are equal to one another and in the special case when the spin axis is at a 45-degree angle relative to the horizontal, the vertical force vectors ($V_1$ and $V_2$) are also equal to the horizontal force vectors ($H_1$ and $H_2$), it follows further that in this special case, the horizontal force $H_1$ $$H_1 = F_{T_1} \text{tg}\alpha_1 = F_{T_2} \text{tg}\alpha_2 \qquad \text{Equation XIII}$$

Since $\text{tg}\alpha_1$ may vary approximately between $\alpha_1 > 1°$ $\text{TG}\alpha_1 \geq 0.02$ $\alpha_1 = 45°$ $\text{tg}\alpha_1 = 1.0$, , depending on the pitch ratios of the spiral grooves 32 and 40, the foregoing calculations indicate that in the first preferred embodiment of the torque converter of the present invention the thrust bearings 74 must absorb a force equivalent in magnitude to a significant portion of the transmitted forces. In other words, the torque converter 30 of the present invention wherein the cooperating Archimedes spiral grooves 32 and 40 are disposed in adjacent coaxially rotating flat surfaces, requires relatively powerful thrust bearings to absorb the incidental axial loads. Therefore, the first preferred embodiment of the torque converter 30 of the present invention is principally suited for applications where relatively low torques are transmitted, such as in certain light duty machines, appliances, automated equipment and the like.

Figure 7:
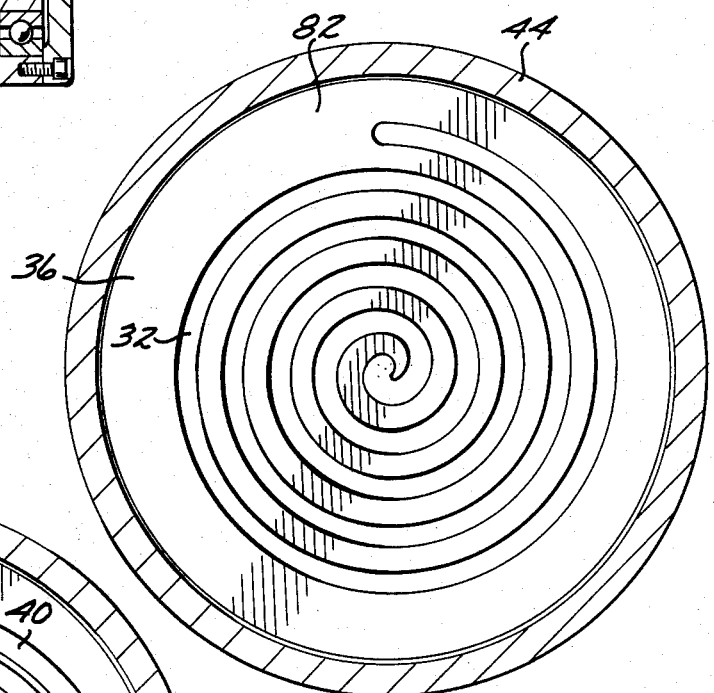
FIG. 7 is another cross-sectional view of the second preferred embodiment of the torque converter of the present invention, the cross-section being taken on lines 7,7 of FIG. 6.
Figure 8:
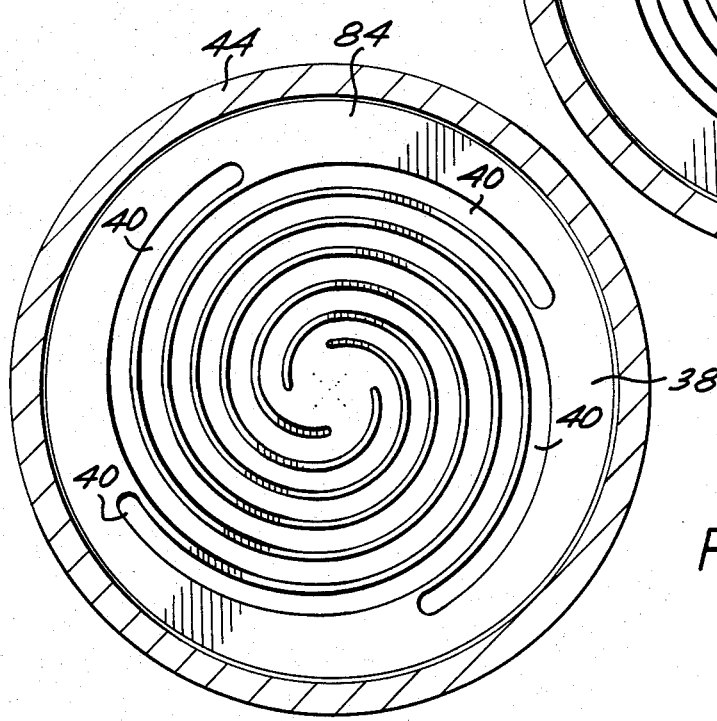
FIG. 8 is still another cross-sectional view of the second preferred embodiment of the torque converter of the present invention, the cross-section being taken on lines 8,8 of FIG. 6.

Referring now to FIGS. 6, 7 and 8, a second preferred embodiment of the torque converter of the present invention is disclosed. The second preferred embodiment is similar in construction and operation to the first preferred embodiment, with the significant difference that the Archimedes spiral grooves are disposed in mating male and female conical surfaces. The male conical surfaces bear the reference numeral 82 and the female conical surfaces bear the reference numeral 84. Although in the second preferred embodiment of the torque converter of the present invention, shown on FIGS. 6 through 8, torque conversion occurs in three (3) stages, the specific illustration of FIGS. 6 through 8 should not be construed to limit the invention in that manner.

A principal advantage of the torque converters of the present invention having conical Archimedes spiral groove-bearing surfaces is the following. The axial forces which must be absorbed by the thrust bearings 74 become smaller as the cone angle becomes smaller. This result should be apparent from a review of the considerations discussed above in connection with FIGS. 13 and 14. In this regard, the first preferred embodiment of the torque converter 30 of the present invention may be considered as a limiting case wherein the cone angle is 90 degrees. Briefly, and illustratively speaking, as the cone angle decreases, a larger and larger portion of the force which is an "unbalanced" "horizontal" force in the first preferred embodiment, becomes a "balanced" "vertical" force which need not be absorbed by the thrust bearings 74. More accurately speaking, in this regard the term "horizontal" really denotes the direction of the axis of rotation of the torque converter 30.

The torque converter of the present invention, having conical complementary Archimedes spiral groove-bearing surfaces, is capable of transmission of large torques without having unduly large thrust bearings 74. Therefore it is suitable for a variety of applications including utilization in transmissions, heavy machinery and the like. Of course, it is also readily applicable for in-line speed reduction and torque conversion in small machines, and in conjunction with relatively light duty motors. Because of its compactness the torque converter is highly suitable for use in association with motors for windshield wipers, household food processors and other household machinery, motors for powered automobile windows and the like.

Figure 11:
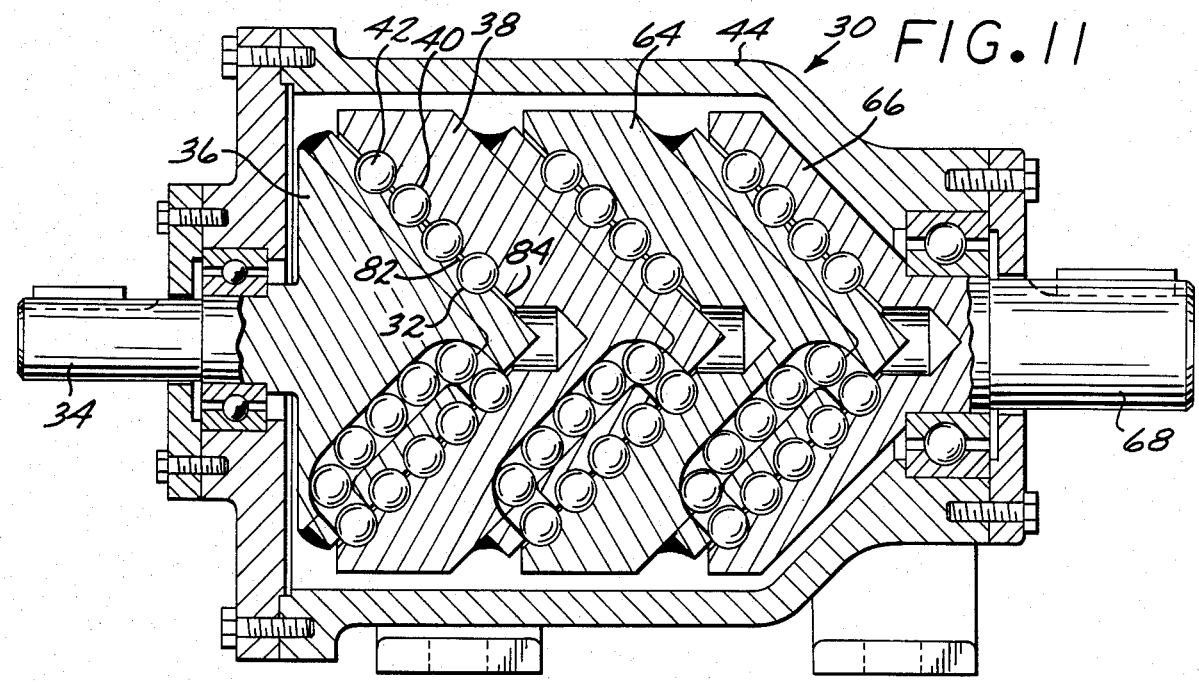
FIG. 11 is a cross-sectional view of a third preferred embodiment of the torque converter of the present invention.

FIG. 11 illustrates a third preferred embodiment of the torque converter of the present invention wherein the cone angle of the conical Archimedes spiral groove-bearing surfaces 82 and 84 is approximately 45 degrees. The third preferred embodiment provides a 100:1 speed reduction in stages of 4:1, 5:1 and 5:1.

The hereinbefore specifically shown embodiments of the speed reducer-torque converter of the present invention employ balls 42 and corresponding spiral grooves of substantially the same size in each stage of the multi-stage speed reducer. In alternative embodiments, however, it may be desirable to employ larger balls, and correspondingly larger spiral grooves, in the slower or end stages of the torque converter than in the faster or input stages. This is because in the slower stages ball speeds are lower but the transmitted torques are significantly higher. In relatively light duty applications, however, it is a definite advantage to utilize balls 42 of uniform size in the entire multi-stage device. This permits the use of several identical intermediate spiral groove-bearing members in several stages of the device and consequently reduces manufacturing costs.

With regard to the dimensions of the spiral grooves of substantially hemispherical cross-section, it is noted that the grooves are preferably machined with approximately 52% conformity, relative to the balls 42, as is customary in the ball and roller bearing manufacturing industry.

Figure 12:
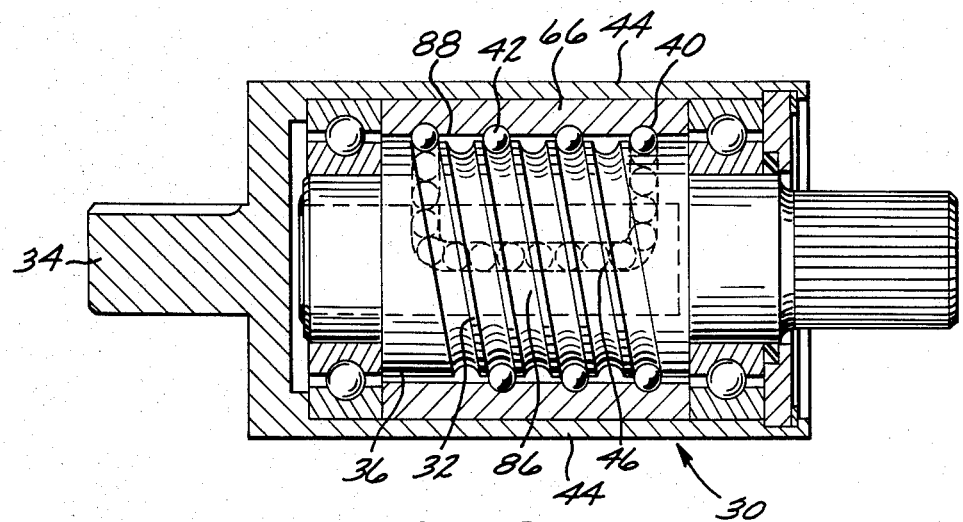
FIG. 12 is a cross-sectional view of a fourth preferred embodiment of the torque converter of the present invention.

Referring now to FIG. 12, a fourth preferred embodiment of the torque converter of the present invention is disclosed. The fourth preferred embodiment employs a first Archimedes spiral groove 32 incorporated into a cylindrical surface 86 of an input member 36. A complementary interior cylindrical surface 88 of an output member 66 is disposed around the cylindrical surface 86 of the input member 36. The interior cylindrical surface 88 incorporates a constant pitch screw groove 40 of a different pitch than the pitch of the first screw groove 32. A substantially U-shaped ball circulation channel 46 is incorporated into the input member 36 to permit circulation of the balls 42 substantially between the two ends of screw grooves 32 and 40. The input and output members 36 and 66 are housed in a suitable external housing 44 on suitable thrust bearings 74. Further particular description of the fourth preferred embodiment of the torque converter of the present invention is not deemed to be necessary in light of the foregoing detailed description of the other embodiments of the present invention. It is noted, however, that multi-stage speed reduction and torque conversion is also possible within the scope of the present invention employing the principles disclosed in conjunction with the fourth preferred embodiment.

During operation of all embodiments of the torque converter or speed reducer of the present invention, the balls 42 continuously circulate in the sense that they enter, one-by-one, the spiral grooves at substantially zero velocity, travel in the spiral grooves while accelerating and describing an Archimedes spiral track, exit from the spiral grooves at a relatively high velocity, and enter the ball circulation channel 46 which causes the balls 42 to return to the spiral grooves. The entire operation is highly favorable for very efficient, relatively friction-free torque conversion. On the basis of basic engineering principles, efficiency is calculated to be approximately ninety (90) to ninety-five (95) percent.

Principal advantages of the torque converter of the present invention include its high efficiency and frictionless operation, adaptability for in-line mounting and operation, and compactness coupled with virtually unlimited range of speed reduction.

Since several modifications of the torque converter of the present invention may become apparent to those skilled in the art in light of the foregoing disclosure, the scope of the present invention should be interpreted solely from the following claims.

What is claimed is:

1. A torque converter comprising:
   a rotatable input shaft;
   a first member mounted on the input shaft to rotate therewith, said first member having a surface having an Archimedes spiral groove of a first predetermined pitch incorporated in said surface;
   a rotatable output shaft mounted coaxially with the input shaft;
   a second member mounted on the output shaft to rotate therewith, the second member having a surface operatively interfacing with the surface of the first member, and having an Archimedes spiral groove of a second predetermined pitch incorporated in said surface;
   ball means mounted between the respective surfaces of the first member and of the second member for being held between the respective Archimedes spiral grooves of the first and second members at a plurality of intersecting spaces of said spiral grooves, said ball means having substantially pure rolling contact with the Archimedes spiral grooves of the first and second members at said intersecting spaces, whereby said ball means move radially and circularly while said input shaft is rotated by an outside force and while being held in said plurality of intersecting spaces, whereby torque is transmitted from the input shaft to the output shaft, and
   channel means provided in one of said first and second members for allowing said ball means to exit from the spiral grooves at a location radially remote from the input shaft and to reenter said spiral grooves in a location proximate to the input shaft, whereby the ball means are continuously circulated to enter the spiral grooves to move circularly and radially outwardly between said spiral grooves.

2. The torque converter of claim 1 wherein the first predetermined pitch is less than the second predetermined pitch whereby the output shaft rotates slower than the input shaft.

3. The torque converter of claim 1 wherein the respective spiral groove-bearing surfaces of the first and second members are substantially flat surfaces disposed substantially at a right angle relative to the axis of rotation of the input shaft.

4. The torque converter of claim 1 wherein the spiral groove-bearing surface of the first member is a substantially conical surface inclined relative to the axis of rotation of the input shaft.

5. The torque converter of claim 1 wherein the ball means comprise a plurality of bearing balls and wherein the balls are restrained between the spiral groove-bearing surfaces of the first and second members solely by said spiral grooves.

6. The torque converter of claim 5 further comprising housing means for housing the input shaft, the output shaft, the first and second members and for providing a preload force in the direction of the axes of the input shaft and output shaft for holding the balls between said spiral grooves.

7. the torque converter of claim 6 wherein the spiral grooves of the respective surfaces of the first and second members have a substantially hemispherical cross-section adapted for substantially conforming to the exterior surfaces of the balls.

8. A torque converter comprising:
   an input shaft rotatable by an outside force;
   an input member fixedly mounted to the input shaft to rotate therewith, the input member having a surface incorporating an Archimedes spiral groove having a predetermined pitch of a first magnitude;
   at least one intermediate member having a first surface incorporating an Archimedes spiral groove having a predetermined pitch of a second magnitude, the spiral groove-bearing first surface of the intermediate member being complementary to the spiral groove-bearing surface of the first member snd being mounted proximate thereto, the intermediate member also having a second surface incorporating an Archimedes spiral groove of a predetermined pitch of a third predetermined magnitude;
   a first plurality of balls disposed between the spiral groove-bearing surface of the first member and the first spiral groove-bearing surface of the intermediate member in intersecting spaces of the Archimedes spiral groove of the first magnitude and of the Archimedes spiral groove of the second magnitude and held therein solely by virtue of being confined in said spiral groove, the first plurality of balls having substantially pure rolling contact with the spiral grooves of the first and second magnitude at said intersecting spaces;
   an output shaft mounted coaxially with the input shaft;
   an output member fixedly mounted on the output shaft to rotate therewith having a surface incorporating an Archimedes spiral groove of a predetermined pitch of a fourth magnitude, the spiral groove-bearing surface of the output member being complementary to the second spiral groove-bearing surface of the intermediate member and being mounted proximate thereto;
   a second plurality of balls disposed between the spiral groove-bearing surface of output member and the second spiral groove-bearing surface of the intermediate member in intersecting spaces of the Archimedes spiral groove of the third magnitude and of the Archimedes spiral groove of the fourth magnitude, and held therein solely by virtue of being confined in said spiral groove, the second plurality of balls having substantially pure rolling contact with the spiral grooves of the third and fourth magnitude in their intersecting spaces, and
   channel means incorporated in the input member and in the intermediate member for respectively allowing said first plurality of balls and said second plurality of balls to exit from the spiral grooves at locations radially remote from the common axis of rotation of the input and output shafts and for respectively allowing said first plurality of balls and said second plurality of balls to reenter said spiral grooves at locations radially proximate to the common axis of rotation of the input and output shaft, whereby rotation of the input shaft results in continuous movement of the first and second pluralities of balls in a circular and radially outward fashion relative to the axis of rotation of the shafts, whereby torque is transmitted from the input shaft to the output shaft, and whereby the magnitude of the torque output of the output shaft relative to the torque input of the input shaft depends on the relative magnitudes of the pitches of the Archimedes spiral grooves provided in the input, output and intermediate members.

9. The torque converter of claim 8 further comprising at least a second intermediate member of the type described in claim 8.

10. The torque converter of claim 8 further comprising housing means for rotatably mounting and housing the input member, the intermediate member, and the output member.

11. The torque converter of claim 10 wherein the housing means further comprise means for applying a preload force of predetermined magnitude in the direction of the common axis of rotation of the input shaft and output shaft.

12. The torque converter of claim 8 wherein each of the spiral grooves has a substantially semicircular cross-sectional configuration substantially adapted to conform to outer surfaces of the balls.

13. The torque converter of claim 8 wherein the spiral groove-bearing surfaces are substantially flat surfaces disposed substantially at a right angle to the common axis of rotation of the input shaft and output shaft.

14. The torque converter of claim 8 wherein the spiral groove-bearing surfaces are substantially conical surfaces angularly inclined relative to the common axis of rotation of the input and output shafts.

15. The torque converter of claim 8 wherein the input member incorporates only a singel Archimedes spiral groove of the pitch of the first magnitude, the first surface of the input member incorporates at least four Archimedes spiral grooves of the pitch of the second magnitude, the second surface of the intermediate member incorporates only a single Archimedes spiral groove of the pitch of the third magnitude, and wherein the surface of the output member incorporates at least four spiral grooves of the pitch of the fourth magnitude.

16. An in-line torque converter and speed changer operating in at least two stages of torque conversion comprising:

an input shaft rotatable by an outside force about an axis;

an input member mounted to the input shaft to rotate therewith, the input member having a surface incorporating a first Archimedes spiral groove of a first predetermined pitch and having its point of origin substantially where said axis intersects the spiral groove-bearing surface;

at least one intermediate member having a first surface complementary to the spiral groove-bearing surface of the input member and incorporating a second spiral groove of a second predetermined pitch, the intermediate member also having a second surface incorporating a third Archimedes spiral groove of a third predetermined pitch, the respective points of origins of the spiral grooves of the intermediate member being respectively where the axis intersects the first and second surfaces;

an output shaft, mounted coaxially with the input shaft;

an output member fixedly mounted to the output shaft to rotate therewith and having a surface complementary to the second surface of the intermediate member and incorporating a fourth Archimedes spiral groove of a fourth predetermined pitch, said spiral groove of the fourth predetermined pitch having its point of origin substantially where the axis intersects the spiral groove-bearing surface of the output member;

a first plurality of balls disposed between the spiral groove-bearing surface of the input member and the first surface of the intermediate member in intersecting spaces of the first spiral groove and of the second spiral groove and held therein solely by virtue of being confined in the intersecting spaces between the first and second spiral grooves, the first plurality of balls having substantially pure rolling contact with the first and second spiral grooves at said intersecting spaces;

a second plurality of balls disposed between the second surface of the intermediate member and the spiral groove-bearing surface of the output member in intersecting spaces of the third and fourth spiral grooves and held therein solely by virtue of being confined in the intersecting spaces between the third and fourth spiral grooves, the intermediate member being held between the input member and output member solely by the first and second plurality of balls, the second plurality of balls having substantially pure-rolling contact with the third and fourth spiral grooves at said intersecting spaces;

channel means provided in at least two of said input, output and intermediate members for allowing the first plurality and second plurality of balls to exit one-by-one from the respective spiral grooves at a point radially remote from the axis, and to enter one-by-one the respective spiral grooves at a point radially proximate to the axis, whereby rotation of the input shafts causes movement of the first plurality of balls simultaneously circularly and radially outwardly from the axis, and causes the intermediate member to rotate at a speed determined by the ratios of pitches of the first and second spiral grooves, the input member and the intermediate member comprising a first stage of torque conversion, and whereby rotation of the intermediate member causes movement of the second plurality of balls simultaneously circularly and radially outwardly from the axis, the causes 'the output member and output shaft to rotate at a speed determined by the ratios of pitches of the third and fourth spiral grooves, the intermediate member and the output member comprising a second stage of torque conversion, and housing means for incorporating the input member, the intermediate member, the output member and for rotatably mounting the input shaft and the output shaft.

17. The torque converter of claim 16 comprising a second intermediate member of the type characterized in claim 16.

18. The torque converter of claim 16 wherein the first surface of the intermediate member incorporates at least four evenly-spaced Archimedes spiral grooves of the second predetermined pitch and having their respective points of origin substantially at the point of intersection of the axis with the first surface, and wherein the spiral groove-bearing surface of the output member incorporates at least four evenly-spaced Archimedes spiral grooves of the fourth predetermined pitch and having their respective points of origin substantially at the point of intersection of the axis with the spiral groove-bearing surface of the output member.

19. The torque converter of claim 18 wherein the spiral groove-bearing surface of the input member incorporates only one spiral groove, and wherein the second surface of the intermediate member has only one spiral groove.

20. The torque converter of claim 16 wherein the first predetermined pitch is less than the second predetermined pitch and wherein the third predetermined pitch is less than the fourth predetermined pitch whereby the intermediate member rotates slower than the input member and the output member rotates slower than the intermediate member.

21. The torque converter of claim 16 wherein the spiral groove-bearing surface of the input member, the first and second surfaces of the intermediate member, and the spiral groove-bearing surface of the output member all are substantially flat surfaces disposed substantially normal to the axis of the input and output shafts.

22. The torque converter of claim 16 wherein the spiral groove-bearing surface of the input member is a conical surface, the second surface of the intermediate member is a conical surface, and the first surface of the intermediate member and the spiral groove-bearing surface of the output member are inner conical surfaces respectively complementary to the conical surface of the input member and to the second surface of the intermediate member.

23. The torque converter of claim 16 wherein all spiral grooves have a substantially semicircular cross-section substantially conforming to the outer surfaces of the respective balls.

24. An in-line torque converter comprising an input shaft rotatable by an outside force;
   an input member mounted on the input shaft to rotate therewith, the input member having a substantially cylindrical surface which is disposed substantially parallel with the axis of rotation of the input shaft and which incorporates a screw groove of a first predetermined constant pitch;
   an output shaft disposed coaxially with the input shaft;
   an output member mounted to the output shaft to rotate therewith, the output member having a substantially cylindrical surface which is disposed substantially parallel with the common axis of rotation of the input shaft and of the output shaft, and is complementary to and operatively interfaces with the cylindrical surface of the input member and which incorporates a screw groove of a second predetermined constant pitch;
   a plurality of balls disposed between the respective cylindrical surfaces of the input member and output member in intersecting spaces of the screw groove of the first predetermined pitch with the screw groove of the second predetermined pitch and held therebetween solely by virtue of being confined in intersecting spaces of the respective spiral grooves, the balls having substantially pure rolling contact with the screw grooves of the first and second predetermined pitch whereby the balls undergo a circular motion relative to the common axis and simultaneously a motion substantially parallel with the common axis, as the input shaft is rotated, and
   circulation channel means for permitting the balls to exit one-by-one from the screw grooves substantially at one end of said interfacing screw grooves and to enter the balls, one-by-one, into said screw grooves substantially at the other end of said screw grooves, whereby continuous rotation of the input shaft causes continuous rotation of the output shaft at a speed which is determined by the ratio of the first predetermined pitch to the second predetermined pitch.

25. The torque converter of claim 24 further comprising a housing for enclosing the input member and the output member and for rotatably mounting the input shaft and the output shaft.

26. The torque converter of claim 24 wherein the cylindrical surface of the input member is an exterior cylindrical surface and wherein the cylindrical surface of the output member is an interior cylindrical surface substantially enveloping the exterior cylindrical surface of the input member.

27. The torque converter of claim 26 wherein the first predetermined pitch is less than the second predetermined pitch whereby the output shaft rotates at a slower speed than the input shaft.

28. The torque converter of claim 24 wherein the screw grooves have a substantially semicircular cross-section which substantially conforms to the exterior surface of the balls.

* * * * *